United States Patent
Shimek et al.

(10) Patent No.: US 8,105,642 B2
(45) Date of Patent: Jan. 31, 2012

(54) SOFT DRIED MARSHMALLOW AND METHOD OF PREPARATION

(75) Inventors: Justin Shimek, Plymouth, MN (US); Andrew Peterson, Minneapolis, MN (US); Susan L. Kamper, Waconia, MN (US); James W. Geoffrion, Anoka, MN (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 1390 days.

(21) Appl. No.: 10/620,038

(22) Filed: Jul. 15, 2003

(65) Prior Publication Data

US 2005/0013923 A1 Jan. 20, 2005

(51) Int. Cl.
*A23G 3/00* (2006.01)

(52) U.S. Cl. ........................................ 426/660; 426/564

(58) Field of Classification Search .................. 426/564, 426/571, 572, 658, 660, 661
See application file for complete search history.

(56) References Cited

U.S. PATENT DOCUMENTS

| | | | |
|---|---|---|---|
| 3,620,769 A | 11/1971 | Peterson | |
| 4,018,901 A | 4/1977 | Hayward et al. | |
| 4,251,561 A * | 2/1981 | Gajewski | 426/571 |
| 4,853,235 A | 8/1989 | Tomomatsu | |
| 5,342,635 A | 8/1994 | Schwab et al. | |
| 5,451,419 A | 9/1995 | Schwab et al. | |
| 5,462,760 A | 10/1995 | Serpelloni et al. | |
| 5,464,649 A | 11/1995 | St. John et al. | |
| 5,695,805 A * | 12/1997 | Borek et al. | 426/620 |
| 6,090,401 A | 7/2000 | Gowan, Jr. et al. | |
| 6,180,158 B1 | 1/2001 | Zietlow et al. | |
| 6,207,216 B1 | 3/2001 | Zietlow et al. | |
| 6,251,452 B1 | 6/2001 | Weinstein et al. | |
| 6,309,686 B1 * | 10/2001 | Zietlow et al. | 426/249 |
| 6,387,432 B1 | 5/2002 | Zietlow et al. | |
| 6,495,179 B1 | 12/2002 | Zietlow et al. | |
| 2004/0109933 A1 * | 6/2004 | Roy et al. | 426/660 |

OTHER PUBLICATIONS

Igoe, Robert. Dictionary of Food Ingredients, 4th Edition. Aspen Publishers, 2001. pp. 66, 67, 128.*

* cited by examiner

*Primary Examiner* — Kelly Bekker
(74) *Attorney, Agent, or Firm* — John A. O'Toole; Everett Diedriks

(57) ABSTRACT

Dried soft aerated confections and methods of their preparation are provided having a water activity of about 0.1 to 0.4 and a glass transition temperature of less than 20° C. The confections comprise sugars, a foaming and a structuring ingredient, preferably each gelatin, and about 5 to 15% softening agent. Preferred softening agents include glycerin, polyglycerols and mixtures thereof. The confections are aerated to densities of about 0.1 to 0.5 g/cc. The soft dried aerated confections are particularly suited for addition to children's Ready-To-Eat cereals in the form of pieces weighing about 0.1 to 2 g each. The dried confection pieces maintain their soft texture over time without causing moisture migration to the cereal.

38 Claims, No Drawings

SOFT DRIED MARSHMALLOW AND METHOD OF PREPARATION

BACKGROUND OF THE INVENTION

The present invention is directed generally to food products and to their methods of preparation. In particular, the present invention is directed to improve aerated confectionery products such as dried but soft marshmallows for addition to ready-to-eat cereals and the processes for making such improved aerated confectionery products.

Aerated confections are popular food items. Some aerated confections comprise a fat constituent while others are substantially free of such fat constituents. An illustrative fat free aerated confection is the common marshmallow. Such marshmallow products are familiar in both larger and smaller sizes.

It is well known that such marshmallows when fresh are soft and pliable but will stale by losing moisture and become hard. Indeed, purposefully pre-dried aerated confections are also well known. These products, particularly in smaller or bit sizes, are commonly added to certain popular Ready-To-Eat ("R-T-E") breakfast cereals, particularly those marketed to children, e.g., Lucky Charms® brand R-T-E cereal. Due to their small size (i.e., having a number count of 4 to 6/g), these dried aerated confectionery marshmallow products are sometimes colloquially referred to as "Mar." bits or "marbits". The marbits must be pre-dried to the low water activities (0.1-0.4) of the R-T-E cereals prior to admixture in order to reduce unwanted moisture migration from the marbit to the cereal and thus to forestall the multiple problems resulting therefrom. Such products have been immensely popular for over 40 years.

Generally, small conventional marshmallow pieces are simply dried to produce light and frangible dried confection pieces (see for example, for dried marshmallows, the method can additionally include one or more drying steps. (See, for example U.S. Pat. No. 4,785,551 issued 2 Nov. 1988 to W. J. Meyer entitled "Method of Drying Confection Pieces" which is incorporated herein by reference).

However, particular attention can be made to formulation and processing of such dried aerated confection pieces to modify one or more properties. For example, the marshmallow can be formulated to be quick dissolving (see for example, U.S. Pat. No. 6,090,401 "Stable Foam Composition" issued Jul. 18, 2000 to Gowan, Jr., et al.). Dried marshmallows comprising a slowly dissolving portion and a more quickly dissolving portion have recently been developed. (See, for example, U.S. Pat. No. 6,207,216 "Quickly dissolving Aerated Confection and Method of Preparation" issued Mar. 27, 2001 to Zietlow et al. and U.S. Pat. No. 6,436,455 "Multi-Colored Aerated Confectionery Products" issued Aug. 20, 2002 to Zietlow et al.). Such products appeal to children by having a portion more quickly dissolve in cold milk to reveal thereby a shape in relief.

Conversely, the dried marshmallows can be processed to remain to resist dissolution and remain crisp in milk. (See, for example, U.S. Pat. No. 6,387,432 "Dried Marshmallow Method of Preparation for Increasing Bowl Life" issued May 14, 2002 to Zietlow et al.).

Consumer food products require constant innovation to maintain popularity. Innovation and change are even more important for those consumer food products oriented towards children. While crisp or frangible dried marshmallow confections suitable for addition to R-T-E cereals are popular, it would be desirable to be able to provide dried marshmallow confections of different appearances and/or textures that provide novelty texture appeal such as being not only dried but also soft in texture.

In view of the present state of the art, there is a need for dried but soft aerated confections as well as methods for their manufacture.

The present invention provides improvements in dried aerated confections to dried yet soft products and to methods for preparing aerated confections that involve preparing aerated confections having a glass transition temperature below room temperature and preferably below that of cold milk (i.e., at or below 40° F.; or 5° C.) whereby the confection remains soft and pliable even though dried to low water activity values.

The present invention resides in part in the inclusion of humectant and plasticizing ingredients to provide the desired lowering of the glass transition temperature and binding of additional water in dried aerated confection products. These ingredients function as "softening agents" of the confection texture and will be referred to as such.

SUMMARY OF THE INVENTION

In its product aspect, the present invention resides in dried yet soft marshmallow aerated confection compositions. The dried but soft pieces are desirable confection products themselves. Also, the dried soft products are particularly suitable for addition to consumer food products such as R-T-E cereals and other shelf stable consumer food products. The compositions can also be a component, layer, portion or phase of food (such as a cookie, candy or snack) products.

The dried marshmallow compositions are characterized by a water activity ranging from about 0.1-0.4. The aerated confections have a density ranging from about 0.1-0.35 g/cc. The compositions have a glass transition temperature of less than room temperature (20° C.>$T_g$).

The products can include shaped and sized pieces fabricated from the present compositions weighing about 0.1 to 10 g each.

The dried soft aerated confections comprise:
- About 50 to 95% (dry weight basis) of a saccharide component;
- About 0.05% to 15% (dry weight basis) of a foaming ingredient
- About 0.5 to 20% (dry weight basis) of a structuring agent; and,
- About 5-25% (dry weight basis) of a softening agent;
- About 1 to 10% moisture;

These products can be of one color or multi-colored.

In its method aspect, the present invention is directed to methods for preparing dried but soft aerated confection products. The methods comprise the steps of:

A. providing a heated liquid confection blend including
   - About 50 to 95% (dry weight basis) of a saccharide component;
   - About 0.05% to 15% (dry weight basis) of a foaming ingredient
   - About 0.5 to 20% (dry weight basis) of a structuring agent; and,
   - About 5-25% (dry weight basis) of a softening agent;
   - About 1 to 30% moisture;

B. aerating the liquid confection blend to form an aerated confection plastic foam having a density of about 0.1 to 0.35/cc and a temperature of about 30 to 85° C. (about 90 to 180° F.) to form a foam;

C. extruding the aerated foam at a temperature of about 30 to 85° C. (about 90 to 180° F.) to form a plastic aerated confection extrudate;

D. cooling the extrudate to set the confection to form a set aerated confection extrudate; and, E. forming the set aerated confection extrudate into pieces; and, F. drying the pieces to a water activity value ranging from about 0.1-0.4 to provide dried soft aerated confection pieces having a density of about 0.1-0.35 g/cc.

DETAILED DESCRIPTION OF THE INVENTION

The present invention relates to dried, aerated confection products characterized by glass transition temperatures significantly less than room temperature that thereby remain soft and to their methods of preparation and use. Each of the product components as well as product use and attributes and methods of their preparation are described in detail below.

Throughout the specification and claims, percentages are by weight dry weight basis and temperatures in degrees Centigrade unless otherwise indicated. Each referenced US patent or patent application is hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Aerated Confection

The aerated confection compositions comprise a saccharide ingredient(s), a foaming ingredient, a foam structuring ingredient, a softening agent, and residual moisture.

Saccharide

The present dried soft aerated confectionery compositions and products fabricated from such compositions comprise about 50 to about 95% (dry weight basis) of a saccharide component as the principle ingredient. Preferably, the saccharide component is used at about 70% to 90% of the confectionery compositions.

The saccharide component can include pure monosaccharide dextrose (e.g., anhydrous, monohydrate or dextrose syrup) and disaccharide sugars such as sucrose, and fructose, as well as hydrolyzed starch syrups such as corn syrup which include dextrin, maltose and dextrose, invert sugar syrups which include levulose and dextrose and/or converted fructose or glucose syrups. A portion of the saccharide component can be supplied by impure or flavored saccharidic ingredients such as fruit juices, purees, honey nectars, concentrated fruit juices, fruit flavors and mixtures thereof. The saccharide component can also include polysaccharides such as cornstarch.

In the preferred embodiment, the saccharide ingredient comprises sucrose and in more preferred embodiments, at least a majority of the saccharide ingredient is provided by sucrose. In the preferred embodiment at least a portion, and in more preferred embodiments, a minority of the saccharide ingredient is provided by corn syrup. In certain preferred embodiments, the saccharide ingredient includes both sucrose and corn syrup in a weight ratio of sucrose to corn syrup (dry weight basis) ranging from about 1:1 to about 5:1

In still other variations, the saccharide component can be provided in part by inulin or other fructo oligo saccharides ("FOS") materials. Good results are obtained when the present compositions contain 0.1% to 20%, preferably about 1% to 10%, inulin or other FOS materials. Inulin is well known and is a staple of commerce. Inulin is a particularly useful β-2-fructofuranose material. Inulin is a well-known material long used as a food supplement. Inulin is a carbohydrate material derived from a variety of crops importantly from Jerusalem artichoke and chicory. However, inulin is known for use as a prebiotic, that is, a food material that is metabolized in the intestine by desirable bacteria such as bifidus and lactobacillus. The promotion of desirable intestinal flora is thought to be related to a variety of health benefits.

Generally, inulin is the clean, dried fibrous material which is separated by extraction from, for example, chicory, onions and Jerusalem artichokes and other common plant sources. Inulin is available in various commercial grade varieties. Pure inulin is commercially available from, for example, Rhone-Poulenc in the U.S. under the trade name RAFTILINE® and from Imperial Suicker Unie, LLC in Europe. Pure inulin has an average degree of polymerization ("DP") of about 9 to 10. Less preferred for use herein are less pure inulin source materials such as a dried Jerusalem artichoke flour, deflavored onion flour and mixtures thereof. Also useful herein are oligofructose materials available under the RAFTILOSE trade name from Rhone-Poulenc. Such materials are plant derived and have a DP of about 2 to 7, i.e., with fructose claims of up to about seven fructose units.

The β-2-fructofuranose material useful herein includes oligomers and polymers thereof. Particularly useful in terms of cost and availability are inulin and fructoogliosaccharides ("FOS") and mixtures thereof.

FOS materials are also available commercially such as from GTC Nutrition Company, Westminster, Colo. FOS materials have an average degree of polymerization ("DP") ranging from about 2-4 polyfructans.

While in the balance of the present description the use of inulin is described, the skilled artisan will appreciate that other β-2 fructofuranose materials described above can be used in full or partial substitution for the particular inulin materials described as can be other oligosaccharides, e.g., oligomanans.

Foaming Ingredient

The confection further includes about 0.05 to 15%, preferably about 1 to 4%, and most preferably about 2.5 weight percent of a foam forming or whipping or foaming ingredient. Suitable ingredients include as protein based whipping agents such as soy proteins, albumen, sodium caseinate, whey proteins, gelatin and mixtures thereof. Suitable non proteinaceous whipping agents are selected from the group consisting of low molecular weight surfactants (e.g. sodium lauryl sulfate ("SLS"), lecithin), polymers (e.g. methyl cellulose ("MC"), hydroxypropyl methyl cellulose ("HPMC"), propylene glycol alginate ("PGA")) and mixtures thereof.

For products to be marketed in North America, the preferred foaming agent is gelatin. The gelatin can be derived from bovine (cow), equine (horse), porcine (pig), ovine (sheep or goats) or piscine (fish) sources or can be of mixtures thereof. Due to its cost and source purity, bovine gelatin is preferred in the United States. Preferred for use herein is high Bloom strength gelatin, e.g., 200 Bloom strength or 250 Bloom strength.

Structuring Ingredient

The improved dried soft confection compositions can additionally include about 0.5 to 20%, preferably about 1 to 6% and most preferably about 2.5% (by weight) of a foam structuring or gelling component. Suitable structuring components include gelatin; hydrophilic colloids such as pectin; modified starches; gums such as guar and carrageenan; and, mixtures thereof. For products to be marketed in North America, the preferred structuring agent is gelatin. In a preferred embodiment, gelatin thus is used as both the foaming and structuring ingredient and in the most preferred embodiment for North America, the only foaming and structuring agent. Of course for those markets where consumers are concerned about transmissible spongiform encephalopathies (e.g, mad cow disease or bovine spongiform encephalopathy; scrapie—which affects sheep, and/or Chronic Wasting Disease which affects deer and elk), gelatin from cows, sheep and cervids (e.g., elk, deer) are less preferred. Thus, in another protein free embodiment, the structuring agent is a combination of carrageenan and guar gums.

Softening Agents

The present compositions and articles fabricated therefrom further comprise sufficient amounts of a softening agent to provide the dried aerated confection with a glass transition temperature at or below room temperature (20° C.>$T_g$), preferably below 5° C. and for best results below −10° C. within the dried water activity range of 0.1 to 0.4. In certain embodiments, the $T_g$ can be as low as −30° C. Especially desirable are those compositions herein that have a $A_w$ of 0.1-0.3 and nonetheless have a $T_g$ of 20° C. or less. Such low glass transition temperatures provide soft textures even when the dried confections are chilled by the addition of refrigerated milk to R-T-E cereals that include such dried marshmallow pieces. Generally, however, good results are obtained when the present aerated confections compositions and articles fabricated therefrom comprise about 5% to about 25% (dry weight basis) of the softening agent, preferably about 5% to 15%, and for best results about 8% to 12%. Softening agents are well known and the skilled artisan will have no difficulty in selecting ingredients useful for use herein as a softening agent. For example, useful ingredients for the softening agent herein include polyglycerols such as xylitol; maltitol, erythritol, isomalt, lactitol, sorbitol, mannitol, inositoal, hydrogenated starch hydrolysates (HSH), including hydrogenated glucose syrups, maltitol syrups, and sorbitol syrups, glycerin, propylene glycol and mixtures thereof. Preferred for use herein is glycerin. Since some consumers are sensitive to a bitter flavor from products containing higher levels of glycerin, preferred for use herein are products having less than about 10% glycerin. If higher levels of softening agent are required and glycerin is used as a softening agent, then the glycerin level can be supplemented by one or more other softening agents to provide the desired softening agent levels to minimize the bitter off-flavor of high glycerin levels.

Moisture

The present dried soft aerated confections are dried to moisture levels that provide a water activity ($a_w$) value ranging from about 0.1-0.4, preferably about 0.15 to 0.25. Products dried to such water activity values are particularly suitable for addition to dry shelf stable ready-to-eat products such as R-T-E cereals, dry hot chocolate powders, instant oatmeal or other dried products for hot cereals (e.g. hot farina), cereal bar products, granola and health bars, dried fruit bars, candy bars as well as dry mixes for baked goods. By virtue of their low water activity, the dried products are useful as confections per se. The present aerated confectionery compositions can range in moisture content about 1 to 15%. In one variation, the aerated confections can be in the form of a soft marshmallow defined in part by a moisture content of about 1 to 10%, preferably 1-5%.

The present aerated confection products are gasified or aerated to have densities in the range of from about 0.10 to about 0.35 g/cc, preferably about 0.2-0.3 g/cc using air, nitrogen, inert gases, etc. Preferred for use herein as the aeration gas is nitrogen. Of course, once prepared, the gas within the air cells of the dried foam products will equilibrate with the atmosphere.

Supplemental Ingredients

If desired, the present dried aerated confection compositions and products prepared there from can additionally include one or more ingredients to improve their appearance, flavor, nutritional value, and/or other organoleptic attributes.

For example, the compositions can be optionally flavored and/or colored to provide uniform products or products having phases of variously colored and flavored potions. By "color" it is meant a confection of any color, including white, which may be provided by the base confection ingredients, and by additional artificial or natural coloring agents. "Color" also includes various hues or shades, e.g., pink and red. The flavors and colors can be selected to appeal to children, e.g., chocolate, cinnamon, fruit flavors, or can include complex flavor combinations or exotic flavors intended to appeal to adults, e.g., coffee, amaretto, rum. If present, such supplemental flavor and/or color ingredients can comprise from about 0.1% to 8% (dry weight basis), preferably about 0.5% to 5% of the composition.

The present compositions and articles fabricated therefrom optionally can further comprise about 0.01% to about 25% of a nutritional fortifying ingredient in dry particulate form. The nutritional fortifying ingredient can be selected from the group consisting of biologically active components, fiber, micronutrients, minerals, and mixtures thereof. Suitable biologically active components can comprise nutricueticals, medicinal herbs (e.g., St. John's wort, rose hips), therapeutic or ethical drugs such as prescription drugs, and mixtures thereof. Nutriceuticals can include both heat-sensitive (such as soy isoflavones and certain botanicals) and heat tolerant materials (e.g., ribosome, chromium picolinate). Fiber can include both soluble and insoluble and mixtures thereof. Preferred micronutrients are selected from the group consisting of vitamins, trace elements (e.g., selenium, chromium, copper, manganese, iron, zinc,) and mixtures thereof. Preferred minerals include calcium, phosphorus (e.g., from phosphates), magnesium and mixtures thereof. Minerals and trace elements differ in concentration with trace elements typically being measured in ppb. The skilled artisan will also appreciate that some materials can have multiple functionality. For example, chromium picolinate is not only a nutriceutical but also a bioavailable source of chromium.

Due to potential heat sensitivity, the nutritional or fortifying or therapeutic ingredient is preferably added in dry form as part of the seeding step described below. More preferably, the nutritional fortifying ingredient is added in the form of a fine powder as part of the seeding step described below having a particle size such that 90% has a particle size of less than 150 micron, preferably 100 μm or most preferably less than 25 micron in size.

In certain embodiments, the present products comprise a calcium ingredient of defined particle size in an amount effective to provide the desired calcium enrichment. Good results are obtained when the present aerated confectionery compositions comprise sufficient amounts of calcium ingredients to provide the total calcium content of the composition to from about 50 to 2800 mg per 28.4 g (1 oz) serving (dry basis) (i.e., about 0.1% to 10% by weight, dry basis) of calcium, preferably about 100 to 1500 mg calcium per 28.4 g (1 oz.) (i.e., about 0.2% to about 5%), and more preferably about 250 to 1500 mg calcium/oz. *about 0.5% to about 5%).

Useful herein to supply the desired calcium levels are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone has trace metal concentrations of less than 10 PPM. Useful levels of calcium carbonate range from about 0.5% to 4% in the finished product. Such calcium material levels insures that the calcium content in the finished product ranges from about 50 mg to 2500 mg/oz Also useful herein are insoluble mineral calcium salts, particularly calcium phosphate salts. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic ($CaH_4(PO_4)_2 \cdot H_2O$), dibasic ($CaHPO_4 \cdot 2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%).

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2 \cdot Ca(OH)_2$. This product provides assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Preferred for use herein are calcium ingredients selected from the group consisting of food grade calcium carbonate, ground limestone, calcium phosphate salts and mixtures thereof. A good material, for example, is ground limestone of high purity having an average particle size of 3.8 µm available from Pluess-Stauffer (California), Inc. (Lucerne Valley, Calif.).

The calcium ingredient regardless of source or type is further characterized by a particularly fine particle size. Such a fine or flour form of the calcium ingredient provides a particle size such that the average particle size is less than 25 µm. Selection of such a fine particle size allows for inclusion of the particulate material without imparting an undesirable gritty mouthfeel. Even more preferred for use herein are calcium ingredients having a mean particle of less than 15 µm and for best results less than 10 µm.

In one preferred embodiment, the marshmallows are fat free, i.e., have fat contents of less than 0.5% (dry weight basis). In these embodiments, the fat level is provided by lipid content associated with one or more ingredients as compared to addition of a fat component. In other variations, e.g., chocolates, the aerated confection can comprise an added fat constituent such as about 1 to 10% cocoa butter, dairy fat or dairy fat containing (e.g., cheese) or other edible fatty triglyceride or fat mimics such as sucrose polyesters. The addition of emulsifiers may aid in the incorporation of fat constituents.

In preferred embodiments, the aerated confections can comprise about 1% to 15% cornstarch resulting from the starch application step practiced as described below.

In certain embodiments, the dried confection formulations can be formulated to be quick dissolving (see for example U.S. Pat. No. 6,207,216 "Quickly Dissolving Aerated Confection and Method of Preparation" issued Mar. 27, 2001 to Zietlow et al. See also commonly assigned U.S. Ser. No. 10/337,030 "Quickly dissolving AERATED CONFECTIONS AND METHODS OF PREPARATION" filed Jan. 6, 2003.

When softening agents are employed that are less sweet and/or can impart a bitter flavor note, such as glycerin, the softening agent can reduce the sweetness flavor of the dried aerated confection. Preferred compositions can additionally comprise a high potency sweetener at levels effective to add desired levels of compensating sweetness to offset the diminution or mask the off flavors associated with the softening agent. Suitable high potency sweeteners are well known and the skilled artisan will have not difficulty in selecting particular ingredients and concentrations for use herein. Preferred for use herein are heat tolerant high potency sweeteners. Such sweeteners are preferred since they can be conveniently added to the sugar syrup or confection blend at high temperatures or can be heated with minimal degradation or loss of this expensive flavor ingredient.

In particular, the food charges can comprise an effective amount of a heat tolerant high potency sweetener such as potassium acetylsulfame, sucralose or mixtures thereof. Sucralose is preferred for use herein since potassium acetylsulfame or "acetylsulfame K" (colloquially, "Ace K") is not yet approved for use in aerated confection products and can impart a bitter taste to some consumers sensitive to potassium. Alitame, neotame, saccharin and cyclamates can also be employed although like acetylsulfame K, current food regulations do not permit usage of these sweeteners aerated confections. Thaumatin can also be used and provides the advantage of flavor masking off flavors. Also useful herein are trehelose, tagatose and mixtures thereof. In less preferred variations, the products can employ supplemental high potency "natural" or plant sweeteners such stevioside such as from ground stevia leaf, stevia extract (an herb, *Stevia rebaudian*, native to Peru and Paraguay) or essence or tincture of *Rubus suavissimus*. Such products are used at amounts effective to provide desired sweetness levels. Such materials are often blended with or formed into powder form by mixing with a solid substrate or carrier such as a starch or maltodextrin. While not temperature stable per se, the sweeteners can be added at levels that compensate for losses during heating of the slurry during production. Generally, such products are used at levels ranging from about 0.05% to about 1% depending upon sweetening power of the active ingredient and concentration of the active ingredient in the sweetener ingredient. It is contemplated that from time to time new high potency sweeteners especially those that are heat tolerant will be developed and approved for use in aerated confection products or that know sweeteners not currently permitted for this food use will be allowed. If and when these heat tolerant high potency sweeteners are developed or known sweeteners allowed, there use herein is contemplated.

Sucralose is the sweetener of choice at present due to its heat tolerance, sweetener potency and flavor, and allowed regulatory status.

In certain less preferred variations, the dried soft aerated confections are also chewy. Such compositions typically include higher levels of fructose, corn syrup or corn syrup solids in partial replacement of sucrose.

Novel marshmallow pieces such as marbit articles are also provided being fabricated from the present compositions and additionally characterized by a size count of 3 to 6 pieces per gram. Of course, larger sized pieces such as conventional sized marshmallow pieces are also contemplated.

The present compositions and marbit articles prepared therefrom can have a bulk compression of 50-85% (at 20° C.). An initial quantity of dried marbits will have a bulk volume. Unlike conventional hard marbits of equivalent moisture content, upon compression, the quantity of marbits can be compressed to less than ½ or even as little as ⅕$^{th}$ their initial bulk volume. The method to simply evaluate confection particulate softness (i.e. compressibility) can be described as a bulk compression test, where a graduated cylinder having an inside diameter of ~6 cm and height of ~17.5 cm and total volume of 500 cm$^3$ is filled with soft dried confection pieces having the approximate dimensions of 12 mm×10 mm×6 mm and density of 0.25 g/cc. A 1 kg weight was allowed to rest on the bulk sample and the total compression (loss of volume) was recorded after 5 minutes. A preferred soft sample lost 50-85% of the original 500 cm$^3$ volume. After the weight is removed a preferred soft sample will springback to recover 20-50% of lost volume in an additional 5 minutes. Thus, in addition to having an Aw ranging from about 0.1-0.4, the present dried confections will have a Tg of 20° C. or less; a bulk compressibility factor of at least 50% and up to 85%. Preferred embodiments can also have a springback factor of a minimum of 20% and up to 50%.

In addition to individual pieces, the present compositions also find suitability for use as a component in other food products. For example, the present compositions can be used to provide a filling or additional layers such as an interior layer or a topical coating in other food products such as candies or cereal bars. The compositions can also be fabricated into complexly shaped pieces such as woven strings similar to licorice strips. The compositions can also be combined with dried fruit puree or fruit pieces to provide combination fruit and candy products. Of course, the dried soft small marshmallow pieces find particular suitability for use as an additive to ready-to-eat cereal products. The products can be flavored and shaped to resemble various conventional geometric shapes or can be in the outline form resembling familiar objects such as characters, vehicles, animals and the like. The products can have an irregular outline.

Unlike conventional dried marshmallows, which do not materially compress under moderate forces or springback when the forces are removed, the present dried soft products exhibit similar compressibility to conventional undried marshmallows. For example, a 500 cm$^3$ bulk sample of soft dried pieces can compress to 50-85% of the original volume in 5 minutes due to the force imparted by a 1 kg weight. When the weight is removed the soft dried pieces can recover up 20 to 50% of the lost volume.

Method of Preparation

The invention further provides methods for making the above-described fortified aerated confection compositions and products.

In its most basic form, a concentrated softening agent bearing sugar confectionery blend or slurry is prepared such as by heating or cooking a blend of sugar(s) and softening agent and water to a controlled moisture content suitable for aeration and thereafter is cooled, and then combined with a gelatin solution to form a confection blend or slurry. That slurry is then aerated to form a foam. After aeration, the foam is extruded through a die to form a rope. The die imparts the desired peripheral shape to the extrudate rope. The rope is allowed to rest briefly to set, and then is cut into desired sizes. The methods can additionally include one or more drying steps. (See, for example U.S. Pat. No. 4,785,551 issued 2 Nov. 1988 to W. J. Meyer entitled "Method of Drying Confection Pieces") to provide the finished dried yet soft aerated confections The present methods thus comprise the steps of providing a liquid softening agent bearing confection blend or slurry having a moisture content; aerating the liquid confection blend or slurry to form a foam; extruding the aerated foam or foam sub-streams to form a plastic aerated confection extrudate; cooling the extrudate to set the confection to form a set aerated confection extrudate; forming the set aerated confection extrudate into pieces; and, drying the pieces to desired water activities to thereby provide dried but soft aerated confection pieces.

However, within this basic method, each step can be practiced with many variations employing various techniques, sub-steps and apparatus. Variations can result from the type or complexity of end product desired, whether existing equipment and production lines can or must be employed or from a desire for the simplest equipment configuration. Production methods can also be continuous, batch or semi-continuous. Steps or sub-steps can be practiced in individual equipment or multiple sub-steps or steps can be practiced in a single piece of equipment as convenient or desired. Variations can also made to accommodate inclusion of various high value potentially heat sensitive ingredients such as pharmaceuticals when the product dried confections are used as carrier for medicines.

The present methods include an initial first step of providing a liquid softening agent bearing confectionery blend or slurry comprising the sacchride component, the foam whipping and structuring agents, a softening agent and moisture.

In the preferred embodiment for North America, both the foam whipping and structuring ingredient is gelatin. Since gelatin is heat sensitive, this step preferably includes the sub-steps of providing a cooled concentrated (i.e., of desired moisture content for aeration after hydrated gelatin addition and thus not requiring cooking to concentrate after combining with the hydrated gelatin) preferably substantially softening agent bearing sugar syrup and the sub-step of admixing or blending gelatin and/or any heat sensitive ingredients therewith to form a cooled liquid softening agent bearing confectionery blend or slurry. Additional heat sensitive ingredients such as flavors, colors or nutritional or therapeutic ingredients can be added prior to aeration to the cooled liquid confection blend or, in certain variations, after aeration. Of coarse, for those embodiments in which the ingredients are heat tolerant (such as for Europe where ingredients other than gelatin are used for the foaming and structuring ingredients that are more heat tolerant), the cooling step can be optional.

By "cooled" is meant at a temperature suitable for admixing a foam structuring ingredient such as gelatin to prevent rapid loss of gelatin functionality. Good results are obtained when the hot liquid confection blend is cooled to temperatures ranging below 26 to 85° C. (80 to 185° F.), preferably about 50 to 70° C. (120 to 160° F.).

Blend or slurry provision step, and more particularly sugar syrup provision substep, itself can comprise a substep of admixing a plurality of sweeteners in a first mixing zone of a vessel including at least one or a first nutritive carbohydrate sweetener(s), preferably in a dry solid form, and at least a second nutritive carbohydrate sweetener, preferably in liquid form such as a sugar syrup (i.e., an aqueous solution of a nutritive carbohydrate sweetener) to form a blended sugar syrup slurry and softening agent and sufficient amounts of water to dissolve any dry sugar(s). In certain embodiments, all or a part of the softening agent is in dry form and the dry portion of softening agent can be conveniently admixed with the other dry ingredients such as the sucrose. In other embodiments, all or a portion of the softening agent is in liquid form, e.g., glycerin. The liquid glycerin can be added before, with, or after water addition. Good results are obtained when the blended sugar syrup slurry prior to being concentrated has a moisture content ranging from about 20 to 30%, preferably about 20 to 25%. Of course, the moisture of the sugar syrup such as liquid corn syrup provides a portion of the moisture content of the blended sugar syrup slurry.

The dry solid sugar can be provided by any conventional nutritive carbohydrate sweetening agent including sucrose, dextrose, corn syrup solids, fructose, dried honey, and mixtures thereof. Preferred for use herein is sucrose.

The starting material liquid sugar syrup is preferably corn syrup but can be supplied by any convenient dissolved sweetener including liquid sucrose (e.g., sucrose dissolved in 30% water), invert sugar syrup, honey, hydrolyzed starch syrups (such as corn syrup, high fructose corn syrup, maltose syrup), fruit juices, concentrated fruit juices (e.g., 34° to 60° Brix), fruit purees, concentrated fruit purees and mixtures thereof. Selection of the dry sugar(s) as well as the sugar syrup and their relative proportion depend importantly upon the composition of the finished confection products prepared herein and the finished product attributes desired.

While the liquid sugar syrup can be added at ambient temperature, conveniently, the liquid sugar syrup starting material can be heated to a feed temperature ranging from about 50 to 95° C. (120 to 200° F.), preferably about 50 to 71° C. (120 to 160° F.). The dry sucrose is conveniently added at ambient temperature. The water can be added at ambient temperature or heated up to boiling (212° F.; 100° C.).

In certain method variations, the softening agent bearing confection blend or slurry is clear, i.e., the slurry preparation is practiced to reduce or remove sugar crystals. Thus in these variations, step, and particularly substep, can further includes a substep of cooking the blended sugar syrup slurry to dissolve any sugar(s) in dry form to produce a clear blended sugar syrup. By "clear" is meant syrup that is substantially free of any undissolved sugar crystals.

The cooking step can also practiced to remove any excess moisture so as to provide a slurry having a moisture content suitable for aeration. Good results are obtained when the softening agent confection blend or slurry has a moisture content during aeration ranging from about 10% to about 25%.

Good results for the production of dried marbits, for example, are obtained when in step the liquid softening agent bearing confectionery blend or slurry comprises:

| Ingredient | Weight % | Preferred range | Most preferred |
|---|---|---|---|
| Sucrose | 52 to 98% | 68 to 82% | ≈75% |
| Corn syrup | 0 to 30% | 10 to 20% | ≈15% |
| Moisture | 2 to 18% | 8 to 12% | ≈10% |
| Softening agent | 5 to 25% | 8 to 15% | ≈12% |
| Foaming ingredient | 0.05 to 15% | .5% to 10% | ≈3% |
| Structuring agent | 1 to 20% | 1 to 10% | ≈3% |

For the preferred embodiment wherein gelatin is used as both the foaming and structuring ingredient, the gelatin can comprise about 2% to 6% of the slurry.

In other variations, the clear slurry is purposefully seed with fine particles, typically powdered sugar, to control the grain and texture of the finished end product. Thus, the method can also optionally include adding or admixing the liquid confectionery blend with a dry solid material such as with 1) a flavoring or nutritional fortifying ingredient in the form of a fine dry particulate alone or in combination with 2) dry sugar crystals prior to the aeration step. The nutritional fortifying ingredient is selected from the group consisting of nutricueticals, an insoluble calcium material, fiber, and mixtures thereof. In particular, the flavoring can include the heat tolerant high potency sweetener such as sucralose.

In still other variations of the present invention, an extruder having at least one screw such as a single or preferably a twin screw extruder can be used to practice in a single piece of equipment the entire method of providing a cooled confectionary blend including the steps of admixing liquid and dry sugars; cooking to form a clear sugar syrup, and concentrating the sugar syrup to form the concentrated sugar syrup and admixing with a hydrated gelatin to form the softening agent bearing confection slurry. Employment of a single piece of equipment, while expensive from an equipment capital cost, provides a simplified means of practicing the present methods. In still other variations, other equipment can be used to practice one or more of the steps or sub-steps herein. For example, a simple jacketed pipe or barrel with in-line static mixers or a hollow screw can be used to practice the cooking or cooling steps. In still another equipment variation, a simple heat exchange operated in a cooling mode can be used to practice the cooling step. In still other variations, the cooling step can be practiced in the same make-up kettle(s).

After aeration, the foam can be subdivided into one or more foam sub-streams and colors and flavors are then added to one or more of the foam sub-streams The particular marshmallow product can be formed into its final shape by an extrusion process. That is more complex shapes can be fabricated by forming variously colored or formulated foam sub-streams and co-extruding to form more complicated shapes and patterns. For dried marshmallows, optionally dividing the foam into a plurality of sub-streams and adding flavors and/or colors to one or more of such sub-streams;

In another variation, the seeding step can involve the addition of about 0.01% to 25% of other nutritional additive materials in dry powder form to provide additional nutritional advantages. For example, a powdered fiber material whether soluble and/or insoluble, e.g., carboxymethyl cellulose and/or wheat bran can be added. Various nutriceuticals, especially those that are heat sensitive, e.g., soy isoflavones, botanicals, etc. Other biologically active ingredients, e.g., drugs, can also be added, if desired. Micronutrients such as vitamins and trace elements can be added. Small quantities of such nutritive materials can be dispersed in various particulate carriers such as starch. These materials can be added alone or in combination with the powdered calcium material(s). It is an advantage of the present method that addition of these materials as part of the seeding step and especially in the form of fine dry powders allows for incorporation with minimal impact on texture of the finished products. While not wishing to be bound by the proposed theory, it is speculated herein that the low moisture availability due to the sugar(s) levels combined with the short duration and low heat of the remaining preparation steps allow these materials to act as relatively inert fillers in the structure of the finished products.

The present methods further comprise the step of aerating the softening agent bearing blend to form an aerated confection foam. In certain variations, a single stream of foam is prepared and subsequently divided in to sub streams of aerated confection to which individual flavors and colors are admixed. In other variations, the slurry prior to aeration can be sub-divided into sub-streams to which flavors and colors or other ingredients are added and each blended slurry sub-stream fed to individual aerators.

In the preferred embodiment, individual colors are added to individual streams of a single continuous stream or batch(es) prior to aerating the product. This results in advantages of having a product that is easier to control because the step of aeration is the last step prior to extruding.

Regardless, in the aeration step a compressed gas is added to the liquid confection blend. The gas can be nitrogen gas or clean air or other suitable gas. By "clean air", it is meant a de-watered and de-oiled air. The gas is kept at room temperature and a suitable pressure such as at a pressure of 120 to 5,700 kPa (40 to 200 psig.). In certain variations, the gas is injected immediately upstream of the aerator. In other variations, all or a portion of the compressed gas can be fed directly to the aerator.

The aeration step forms foam an aerated confection having a density of about 0.1 to 0.5 g/cc, preferably about 0.15 to 0.35 g/cc. Preferably, the aerated foam is maintained at a temperature ranging from about 32 to 82° C. (90 to 180° F.), preferably about 60 to 65° C. (140 to 150° F.). If desired, the aerator(s) can include a cooling means such as cooling water to remove the heat buildup that occurs during the aerating step.

One or more sub-streams of aerated confection are fed to an extruding head or equivalent and the present methods further comprise the step of extruding and/or coextruding the aerated confection at a pumpable temperature such as at about 105 to 150° F. (40 to 65° C.), preferably about 50 to 60° C. to form an aerated confectionery extrudate such as a continuous plastic rope. The extrudate can be characterized by a pattern including a peripheral shape such as a circle, star, animal figure or other shape including both regular and irregular shapes. The pattern can further include colorations including various internal portions or filaments. By "plastic" is meant that the temperature of the extrudate is above the set point temperature of the foam structuring agent. As a result, the rope of extruded foam is easily deformable at these elevated temperatures. In other variations, the foam can be deposited into means for forming shaped pieces such as conventional starch molds.

Conveniently, the extrudate can be applied to a starch bed and a starch coating can be applied to the extrudate to minimize the surface stickiness.

Thereafter, the present methods include a cooling step to allow the structuring agent to set and thereby to form a cooled or set aerated confection such as a marshmallow. The marshmallow can have moisture content of about 5 to 30%, preferably about 5 to 20%, and more preferably about 5% to 15%. Conveniently, such setting times can extend from about 30 to 120 seconds.

The present methods can further comprise the step of forming or cutting the cooled aerated confectionery rope into pieces of desired shape, size and moisture content.

In the manufacture of soft marshmallow or other soft confections, the finished fortified products soft marshmallow so prepared are ready for conventional packaging for distribution for sale. Optionally, the soft marshmallow can be subjected to a modest drying step to adjust the moisture content within the moisture content range described herein.

However, in the preparation of a dried aerated confection, the present methods additionally comprise a finish-drying step to form dried soft marshmallow pieces. Any suitable drying technique, which will remove the moisture content to be about 2 to 8%, is adequate. A marshmallow drying method is taught in U.S. Pat. No. 4,785,551 entitled "Method of Drying Confection Pieces" which is incorporated herein by reference. The '551 patent teaches a rapid, five minute drying step using a two-step fluidized bed heating step.

In another technique preferred herein, the marbits are dried at a slower rate using forced hot air convection drying. For example, the pieces can be put on trays, mounted in a frame that holds about 30 to 40 trays, and rolled into a drying room until adequately dried. The drying room is kept at a warm temperature, for example, about 82.° C. (180° F.). In other implementations, a conveyor through a drying room or tunnel transports the pieces until the desired moisture content is reached.

In a minor variation, broken pieces can be ground to form regrinds that can conveniently be reused by adding back into the dry particulate addition step.

The resulting dried pieces can then be consumed as confections.

The dried soft marshmallow pieces find particular suitability for use as an appealing added component of food products that provides added or supplemental calcium fortification. For example, the pieces can be added to a Ready-To-Eat ("R-T-E") breakfast cereal, especially sugar coated R-T-E cereals intended as children's breakfast cereals.

In other variations, the confections provide appealing carriers for various ethical drugs, vitamins, minerals, fiber and other nutraceuticals and the like. Due to the aerated and frangible texture, the confections are easy to chew and are dried soft.

In a preferred embodiment, the finished RTE cereal can comprise about 65 to 99%, preferably of a conventional dried cereal (such as flakes, shreds, biscuits, puffs formed from a cooked cereal grain or dough of oats, wheat, corn, barley, rice or mixtures) and about 1% to about 35% by weight of the present novel dried yet soft confections 64, preferably about 20 to 30%. In still other variations, the present confections can be admixed with instant oatmeal, dry cocoa beverage mix (especially smaller sized pieces), and dry mixes for other products, e.g., gelatin dessert. The confections can also be used in cereal bar products, toppings for desserts such as ice cream or yogurt, or in various cereal bar products whether in the form of discrete pieces or as a food portion or phase of composite food products. For example, the products can be topically coated with a sugar or chocolate coating to form candies. The confections can also be used as toppings for desserts such as ice cream or yogurt, or on various baked goods.

Dried marshmallow pieces can be fabricated by the present methods that contain, for example, 5% of one color and 95% of a second color. Moreover, one or more of the disparately colored portions can be discontinuous rather than in a single continuous phase.

What is claimed is:

1. A dried soft aerated confection food product, comprising:
   about 65% to 98% of a saccharide component (dry weight basis);
   about 0.05 to 15% of a foaming agent;
   about 0.5% to 20% of a structuring agent;
   1 to 10% moisture,
   at least one color,
   a density of about 0.1 to 0.35 g/cc,
   a water activity ranging from about 0.1 to about 0.4,
   about 5-25% (dry weight basis) of a softening agent to provide a glass transition temperature of less than 5° C., and
   a springback factor of a minimum of 20% and up to 50%.

2. The dried soft aerated confection food product of claim 1 wherein at least a portion of the foaming agent is protein based.

3. The dried soft aerated confection food product of claim 2 wherein at least a portion of the foaming agent or structuring agent is gelatin.

4. The dried soft aerated confection food product of claim 1 having a glass transition temperature of less than −10° C.

5. The dried soft aerated confection food product of claim 3 wherein both the foaming agent and structuring agent are gelatin.

6. The dried soft aerated confection food product of claim 1 having the ability of a 500 cm$^3$ quantity to compress to 50-85% of the original volume in 5 minutes due to the force imparted by a 1 kg weight.

7. The dried soft aerated confection food product of claim 1 wherein the softening agent is selected from the group consisting of polyglycerols, hydrogenated starch hydrolysates, glycerin, propylene glycol and mixtures thereof.

8. The dried soft aerated confection food product of claim 6 comprising:
   about 65 to 98% of the saccharide component (dry weight basis); and wherein at least a majority of the saccharide component is sucrose;
   about 0.5 to 10%. of gelatin;.
   about 2 to 10% moisture; and,
   having a fat content of less than 5%.

9. The dried soft aerated confection food product of claim 7 in the form of shaped pieces each weighing about 0.1 to 10 g.

10. The dried soft aerated confection food product of claim 9 in the form of shaped pieces each weighing about 0.1. to 0.2 g.

11. The dried soft aerated confection food product of claim 9 wherein a major portion of the softening agent is glycerin.

12. The dried soft aerated confection food product of claim 10 having a water activity ranging from about 0.2 to 0.3.

13. The dried soft aerated confection food product of claim 7 wherein the softening agent is selected from the group consisting of glycerin, propylene glycol and mixtures thereof.

14. The dried soft aerated confection food product of claim 1 additionally comprising at least one ingredient selected from the group consisting of flavor or color ingredients, nutritional fortifying ingredients, and mixtures thereof.

15. The dried soft aerated confection food product of claim 14 wherein the at least one ingredient constitutes a nutritional fortifying ingredient selected from the group consisting of biologically active components, fiber, micronutrients, minerals, and mixtures thereof.

16. The dried soft aerated confection food product of claim 15 wherein the nutritional fortifying ingredient comprises biologically active components selected from the group consisting of nutricueticals, medicinal herbs, therapeutic or ethical drugs, and mixtures thereof.

17. The dried soft aerated confection food product of claim 15 including sufficient amounts of a calcium ingredient to provide a calcium concentration of about 0.1 to 5%.

18. The dried soft aerated confection food product of claim 1 having a portion that is of a second color.

19. The dried soft aerated confection food product of claim 1 wherein the dried soft aerated confection food product is in the form of a phase or portion of a composite food product.

20. The dried, soft aerated confection food product of claim 19 wherein the portion is in the form of a topical coating.

21. The dried soft aerated confection food product of claim 19 wherein the portion is in the form of filling.

22. The dried soft aerated confection food product of claim 16 wherein the dried soft aerated confection food product includes at least one vitamin.

23. The dried soft aerated confection food product of claim 19 wherein the dried soft aerated confection food product has at least two phases characterized by different colors, flavors or composition.

24. The dried soft aerated confection food product of claim 16 in the form of a wafer.

25. The dried soft aerated confection food product of claim 24 in the form of a wafer having a thickness of about 1 to 5 mm.

26. The dried soft aerated confection food product of claim 19 wherein the portion is in the form of a peripheral border.

27. The dried soft aerated confection food product of claim 19 wherein the phase or portion is in the form of a core.

28. The dried soft aerated confection food product of claim 27 admixed with a second dry food in particulate form.

29. The dried soft aerated confection food product of claim 28 admixed with a ready-to-eat breakfast cereal.

30. The dried soft aerated confection food product of claim 6 having a springback of 15% of the lost volume within 5 minutes.

31. The dried soft aerated confection food product of claim 7 additionally comprising a high potency sweetener.

32. The dried soft aerated confection food product of claim 31 wherein the high potency sweetener includes sucralose.

33. The dried soft aerated confection food product of claim 32 wherein the high potency sweetener is present in a concentration ranging from about 0.05% to 1%.

34. The dried soft aerated confection food product of claim 1 in admixture with a ready-to-eat cereal.

35. The dried soft aerated confection food product of claim 3 wherein the gelatin is 250 Bloom strength.

36. The dried soft aerated confection food product of claim 1 having a moisture content of 2.0-2.5%.

37. The dried soft aerated confection food product of claim 34 wherein the admixture is in bar form.

38. The dried soft aerated confection food product of claim 1 including a bulk compressibility factor of 50%-85%.

* * * * *